H. M. SIEMANN.
DRILL.
APPLICATION FILED JULY 6, 1917.
1,254,859. Patented Jan. 29, 1918.
2 SHEETS—SHEET 1.
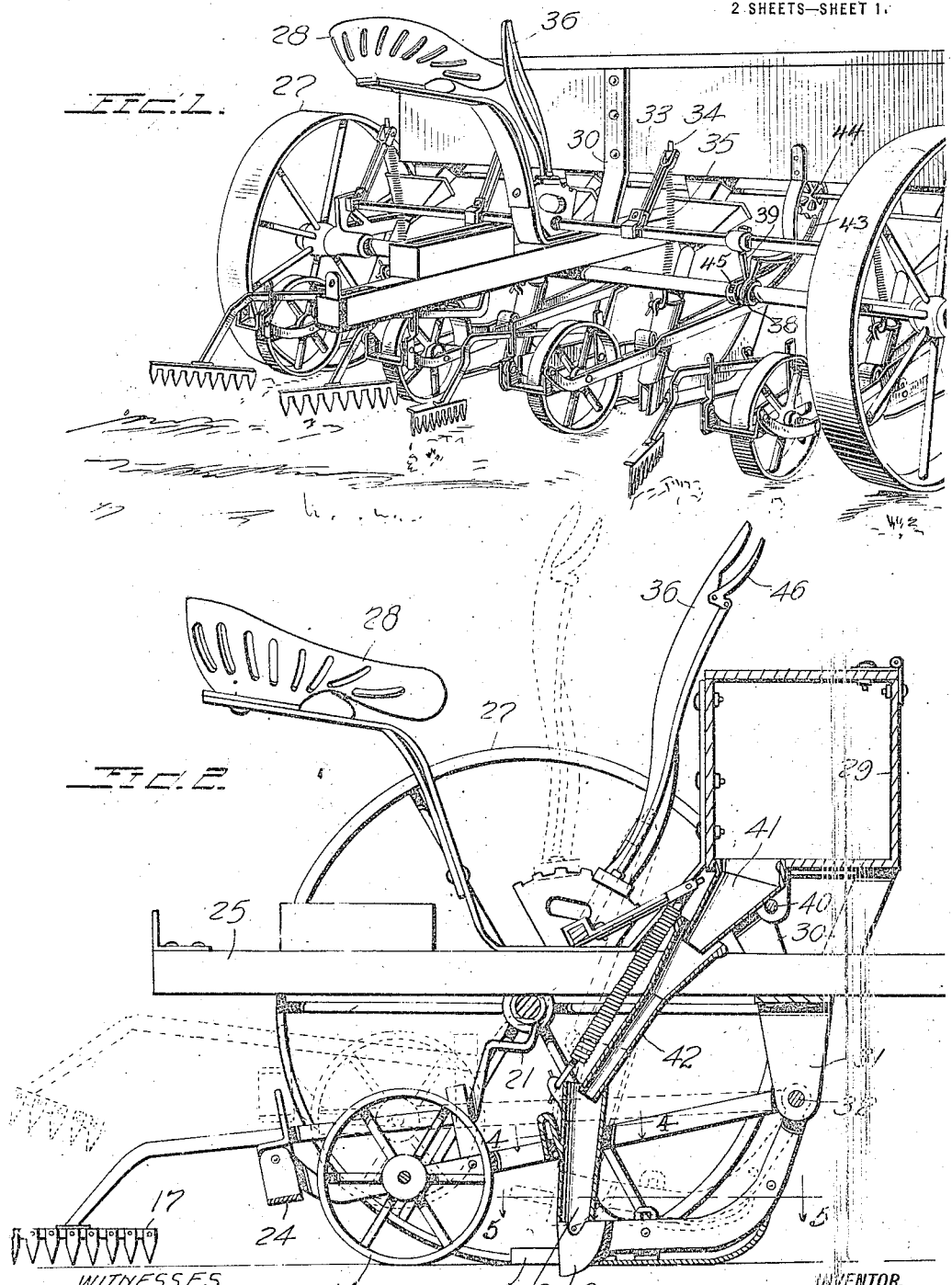

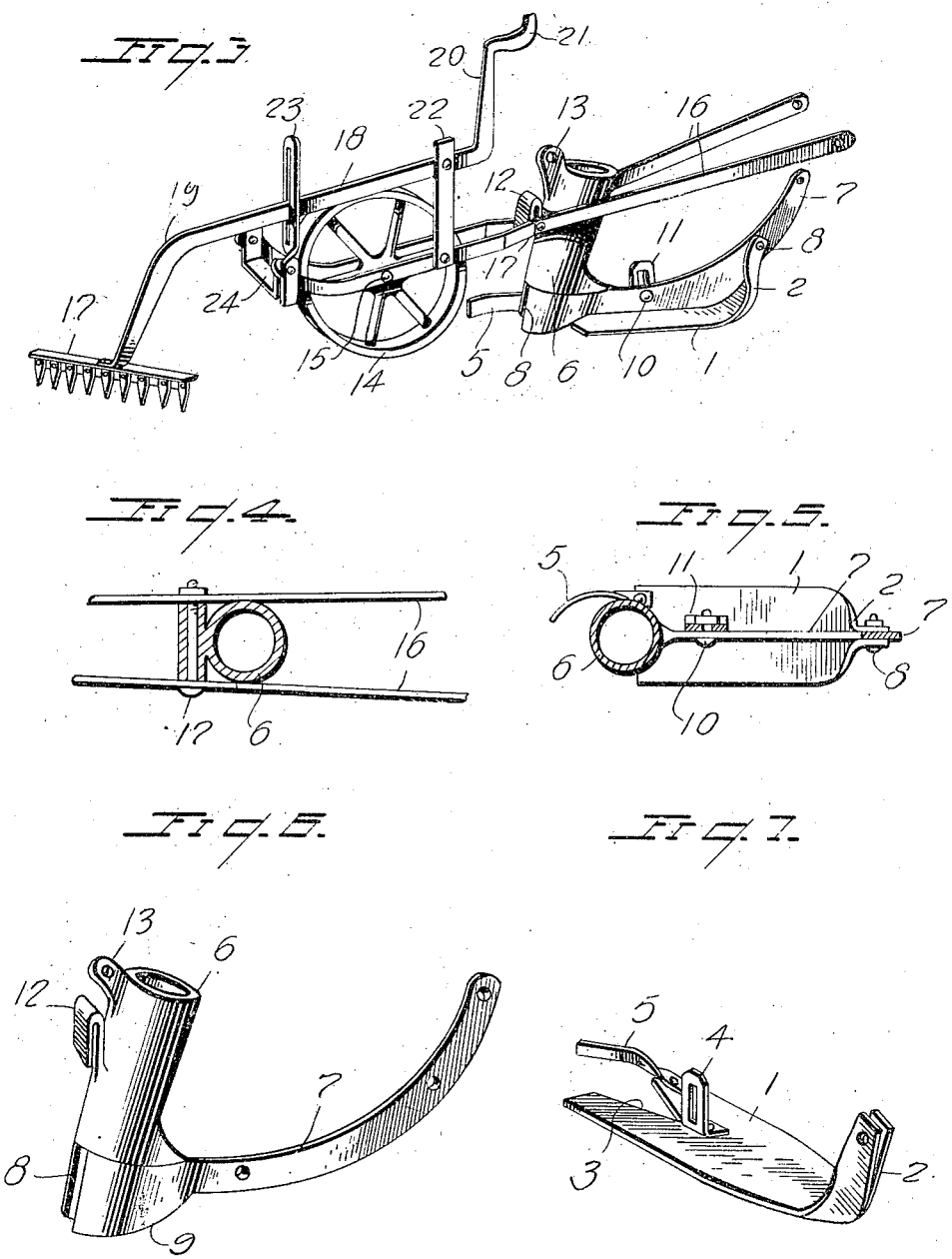

UNITED STATES PATENT OFFICE.

HENRY MORTIMER SIEMANN, OF FORT LUPTON, COLORADO.

DRILL.

1,254,859.  Specification of Letters Patent.  Patented Jan. 29, 1918.

Application filed July 6, 1917. Serial No. 178,894.

*To all whom it may concern:*

Be it known that I, HENRY M. SIEMANN, a citizen of the United States, and a resident of Fort Lupton, in the county of Weld and State of Colorado, have invented new and useful Improvements in Drills, of which the following is a specification.

My invention is an improvement in drills, and has for its object to provide a drill especially adapted for planting beet seed, wherein a floating shoe is provided for smoothing and leveling the ground before the seed are planted, and wherein a covering wheel is arranged behind the shoe for covering the planted seed, and wherein a rake is arranged behind the shoe for providing a mulch to conserve the moisture in the ground.

In the drawings:

Figure 1 is a perspective view of the drill looking from the rear;

Fig. 2 is a vertical section through the drill;

Fig. 3 is a perspective view of one of the drilling elements detached;

Figs. 4 and 5 are sections on the lines 4—4 and 5—5 of Fig. 2, each view looking in the direction of the arrows adjacent the line;

Fig. 6 is a perspective view of the shoe;

Fig. 7 is a similar view of the runner.

In the present embodiment of the invention, a series of drilling elements is provided, each consisting of a runner 1 in the form of a plane plate, having its forward end upturned and split, as shown at 2, and the said runner has a V-shaped notch 3 at its rear end. Just in front of the notch is an upright lug or standard 4, the said standard being slotted vertically, and in the present instance consisting of an angle plate, one portion being secured to the runner and the other standing upright.

Just behind the notch and secured to the rear end of the runner is a bar 5, the said bar being secured at one end to the runner at one side of the notch 3, and the bar is curved, as shown, to cover the seed as they are delivered from the shoe, to be later described.

The shoe, as shown in Fig. 6, consists of a tubular member 6 having a forward upwardly curved extension 7 at its lower end. This extension is received between the split ends of the upturned portion 2 of the runner and is secured thereto by a bolt and nut 8 is a position such that the open bottom of the tubular member 6 will be above the notch 3. It will be noticed that the tubular member is notched at its lower end, as indicated at 8, and at the sides of the front notch the runner is extended, as indicated at 9 to form a species of plow for opening a furrow to receive the seed.

A bolt 10 is passed through the opening in the curved portion 7 of the shoe and through the slot in the standard 4, and the said bolt is engaged by a nut 11 to adjustably connect the shoe to the runner. At its rear the runner has a hook 12 intermediate its ends, and a perforated lug or ear 13 at its top.

A covering wheel 14 is arranged in rear of the shoe and runner, the said wheel being journaled on an axle 15 supported by a pair of approximately parallel bars 16. These bars extend slightly in rear of the wheel and just beyond the shoe in front of the wheel, and they are connected by a bolt 17 in front of the wheel over which the hook 12 engages.

The front ends of the bars and the front end of the curved portion 7 of the shoe are connected with the supporting framework of the drill in a manner to be presently described, and a rake 17 is supported behind the covering wheel. Each of these rakes, which comprises an angle plate having teeth connected to one of the portions thereof, has secured to the center thereof one end of a handle or bar 18. This handle has its ends bent in opposite directions, as indicated at 19 and 20, respectively, one of the said ends 19 being secured to the rake and the end 20 has an extension 21 which is adapted to engage beneath the axle of the supporting framework of the drill when the drilling unit is in place, for a purpose to be later described. The portion 18 of the handle is pivoted to an upstanding plate 22 on one of the bars 16, the said plate being near the front of the wheel, and at the rear of the wheel there is a vertically slotted guide 23 through which the handle passes, the said guide being secured to one of the bars 16. In the rear of the wheel these bars are connected by a substantially U-shaped member 24.

The frame of the seeder consists of a tongue 25 transversely of which is journaled an axle 26, on which are mounted wheels 27. The usual seat 28 is supported by the frame in rear of the axle, and a seed box 29 is connected to the tongue by brackets 30. The seeding units are connected at their forward ends to brackets 31 depending from the frame, the pivotal connection 32 being with the bars 16 and with the forward end of the arm 7. A square shaft 32 is journaled on the frame above the axle, and this shaft has arms 33 which are forked at their outer ends. A block 34 is pivoted between the arms of each fork and a coil spring 35 connects each block with the lug 13 of one of the shoes of a seeding unit. A lever 36 is secured to the shaft, and by means of the lever the shaft may be turned to raise and lower the seeding units. When they are raised, the extension 21 of each rake engages beneath the axle, thus raising the rake, as indicated in dotted lines in Fig. 2.

When the seeder units are raised, the feeding mechanism in the seed box 29 is thrown out of gear. A clutch 38 is provided, and this clutch is operated by an arm 39 on the shaft 32 to release the feed controlling shaft 40 of the seed box from the axle.

Chutes 41 deliver from the seed box into other chutes 42 which deliver into the shoes 6. The shaft 40 is connected to the axle by means of a sprocket chain 43 which engages sprocket wheels 44 and 45 on the shaft 40 and the axle, respectively.

The lever 36 is held in adjusted position by the usual latch mechanism 46.

In use, when the device is on the road, the seeder units are raised into the dotted line position of Fig. 2. This also throws the feeding mechanism operated by the shaft 40 out of gear. When it is desired to sow, the parts are moved into the dotted line position of Fig. 2 and the drill is ready for use. The runners smooth the ground, brushing the clods, roots, stones and the like out of the way, and the plow of the shoe opens a furrow for the seed which are sown through the shoe. The arm 5 covers the seed lightly, and the wheel 14 compacts the soil over the seed. The rakes 17 which are set in inclined position behind the wheels break up the soil into a mulch, which conserves the moisture and assists in the sprouting of the seed.

I claim:

1. A drill of the character specified, comprising a frame, an axle journaled transversely of the frame, wheels on the axle, and a series of planting units connected to the frame, each unit comprising a runner in the form of a plane plate having its front end upturned and having a V-shaped notch at its rear end, a shoe delivering at the notch and adjustably connected to the runner, a wheel in rear of the shoe, a pair of bars between which the wheel is journaled, the shoe having an arm extending forwardly between the front ends of the bars, said bars and arm being pivoted to the frame, the shoe having a hook engaging the bars, and a rake supported behind the wheel by the bars, a handle connected to the rake at one end and pivoted to the bars at the other, and means connected to the shoes for lifting the same, each handle having an extension engaging beneath the axle to lift the rake when the shoes are lifted.

2. A drill of the character specified comprising a frame, an axle supporting the frame, and wheels on the axle, a series of planting units, each comprising a runner, a shoe, a covering wheel, and a rake, arranged in the order named from front to rear, the front ends of the said units being pivoted to the frame, means for lifting the rear end, and means in connection with each rake for engaging the axle to lift the rake when the unit is lifted.

3. A device of the character specified, comprising a wheel supported frame, and a series of seeder units supported by the frame, the front ends of the units being pivoted to the frame, and means for lifting the rear ends of the units, each unit having a rake at the rear thereof, each rake having a forwardly extending handle pivoted to the unit intermediate the ends of the handle, the forward end of the handle engaging beneath the frame when the units are lifted to lift the rake.

4. A device of the character specified comprising a wheel supported frame, and a series of seeder units supported by the frame, the front ends of the units being pivoted to the frame, and means for lifting the rear ends of the units, each unit comprising a runner, a shoe, a covering wheel and a rake, arranged in the order named from front to rear.

5. In a drill of the character specified, a seeder unit comprising a runner, a shoe connected to the runner, the runner having a covering arm in rear of the shoe, a covering wheel, and a rake, arranged in the order named from front to rear, a pair of bars between which the wheel is journaled and adapted for connection at their front ends to a supporting frame, said bars supporting the shoe and runner, and the rake having a handle pivoted intermediate its ends to the bars.

6. In a drill of the character specified, a seeder unit comprising a runner, a shoe connected to the runner, the runner having a covering arm in rear of the shoe, a covering wheel, and a rake, arranged in the order named from front to rear.

7. In a drill of the character specified, seeding units comprising dropping shoes, runner plates for smoothing the path in front of the shoes, each plate having covering means, a compacting wheel, and a rake behind said wheel.

HENRY MORTIMER SIEMANN.

Witnesses:
W. F. BOLTON,
J. ALLAN.